US012749316B1

(12) United States Patent
Amini et al.

(10) Patent No.: US 12,749,316 B1
(45) Date of Patent: Sep. 29, 2026

(54) SYSTEMS AND METHODS FOR DETECTING ANOMALIES IN VIDEOS

(71) Applicants: Mohammadhadi Amini, Miami, FL (US); Khandaker Mamun Ahmed, Miami, FL (US); Shamim Yazdani, Miami, FL (US)

(72) Inventors: Mohammadhadi Amini, Miami, FL (US); Khandaker Mamun Ahmed, Miami, FL (US); Shamim Yazdani, Miami, FL (US)

(73) Assignee: The Florida International University Board of Trustees, Miami, FL (US)

(*) Notice: Subject to any disclaimer, the term of this patent is extended or adjusted under 35 U.S.C. 154(b) by 3 days.

(21) Appl. No.: 19/184,493

(22) Filed: Apr. 21, 2025

(51) Int. Cl.

| | |
|---|---|
| ***G06V 20/52*** | (2022.01) |
| ***G06N 3/044*** | (2023.01) |
| ***G06N 3/0464*** | (2023.01) |
| ***G06N 3/08*** | (2023.01) |
| ***G06V 10/30*** | (2022.01) |
| ***G06V 10/774*** | (2022.01) |

(Continued)

(52) U.S. Cl.
CPC ............ *G06V 20/52* (2022.01); *G06N 3/044* (2023.01); *G06N 3/0464* (2023.01); *G06N 3/08* (2013.01); *G06V 10/30* (2022.01); *G06V 10/774* (2022.01); *G06V 10/82* (2022.01); *G06V 10/95* (2022.01); *G06V 20/44* (2022.01); *G06V 20/49* (2022.01)

(58) Field of Classification Search
CPC ...... G06V 20/52; G06V 20/44; G06V 10/774; G06V 10/95; G06V 10/30; G06V 10/82; G06V 20/49; G06N 3/08; G06N 3/044; G06N 3/0464
See application file for complete search history.

(56) References Cited

U.S. PATENT DOCUMENTS

| | | | | |
|---|---|---|---|---|
| 11,875,566 B1 * | 1/2024 | Amini | .................... | G06V 20/40 |
| 2010/0246953 A1 * | 9/2010 | Guermoud | ........... | H04N 7/0115 382/168 |

(Continued)

FOREIGN PATENT DOCUMENTS

| | | | |
|---|---|---|---|
| WO | WO-2021032295 A1 * | 2/2021 | ............. G06V 20/41 |

OTHER PUBLICATIONS

Vosta, Soheil, and Kin-Choong Yow. "A cnn-rnn combined structure for real-world violence detection in surveillance cameras." Applied Sciences 12.3 (2022): 1021. (Year: 2022).*

(Continued)

*Primary Examiner* — John Villecco
*Assistant Examiner* — Alexander John Rodgers
(74) *Attorney, Agent, or Firm* — SALIWANCHIK, LLOYD & EISENSCHENK

(57) ABSTRACT

Systems and methods are provided for detecting anomalies in videos (e.g., surveillance videos) in a distributed manner to enhance data privacy and improve model robustness, model accuracy, and scalability of the system. Computer-based systems and methods can ensure enhanced privacy among different computing devices/clients while training a machine learning model without the requirement of data sharing with a server. A data trimming method, a histogram-based noise cleansing method, a frame selection method, a data distribution method among different clients, and a convolutional neural network and recurrent neural network model can be employed for video classification.

20 Claims, 7 Drawing Sheets

(51) Int. Cl.

| | |
|---|---|
| ***G06V 10/82*** | (2022.01) |
| ***G06V 10/94*** | (2022.01) |
| ***G06V 20/40*** | (2022.01) |

(56) References Cited

U.S. PATENT DOCUMENTS

| | | | | |
|---|---|---|---|---|
| 2013/0287298 | A1* | 10/2013 | Adams | G06T 5/70 382/168 |
| 2015/0085943 | A1* | 3/2015 | Taniguchi | H04N 5/145 375/240.29 |
| 2020/0134813 | A1* | 4/2020 | Palmer | G06T 7/0014 |
| 2021/0337352 | A1* | 10/2021 | Udipi | G06Q 10/00 |
| 2021/0374502 | A1* | 12/2021 | Roth | G06N 3/045 |
| 2022/0245904 | A1* | 8/2022 | Saxena | G06T 19/006 |
| 2022/0346132 | A1* | 10/2022 | Shen | G06F 9/5027 |
| 2026/0011146 | A1* | 1/2026 | Mottu | G06V 20/41 |

OTHER PUBLICATIONS

Al-Lahham, Anas, et al. "A Coarse-to-Fine Pseudo-Labeling (c2fpl) Framework for Unsupervised Video Anomaly Detection." Proceedings of the IEEE/CVF Winter Conference on Applications of Computer Vision. 2024.

Doshi, Keval, et al. "Privacy-Preserving Video Understanding via Transformer-Based Federated Learning." 2023 IEEE Conference on Dependable and Secure Computing (DSC). IEEE, 2023.

Liu, Zuhao, et al. "Generating Anomalies for Video Anomaly Detection with Prompt-Based Feature Mapping." Proceedings of the IEEE/CVF conference on computer vision and pattern recognition. 2023.

Lv, Hui, et al. "Unbiased Multiple Instance Learning for Weakly Supervised Video Anomaly Detection." Proceedings of the IEEE/CVF conference on computer vision and pattern recognition. 2023.

Mumcu, Furkan, et al. "Adversarial Machine Learning Attacks Against Video Anomaly Detection Systems." Proceedings of the IEEE/CVF Conference on Computer Vision and Pattern Recognition. 2022.

Srivastava, Nitish, et al. "Unsupervised learning of Video Representations using lstms." International conference on machine learning. PMLR, 2015.

Sultani, Waqas, et al. "Real-world Anomaly Detection in Surveillance Videos." Proceedingson computer vision and pattern recognition. 2018.

* cited by examiner

| Model | Client learning rate | Server learning rate | Training accuracy | Validation accuracy | Epochs | Frame number |
|---|---|---|---|---|---|---|
| FedInceptionResNetV2 | 1e−5 | 3e−4 | 83.3% | 63.5% | 55 | 20 |
| FedInceptionResNetV2 | 3e−6 | 5e−4 | 83% | 37.5% | 165 | 20 |
| FedInceptionResNetV2 | 3e−6 | 5e−4 | 100% | 63.5% | 65 | 20 |
| FedInceptionResNetV2 | 1e−4 | 1e−4 | 100% | 57.14% | 48 | 20 |
| FedInceptionResNetV2 | 3e−5 | 5e−4 | 75% | 62.5% | 122 | 20 |
| FedInceptionResNetV2 | 3e−5 | 6e−4 | 75% | 50% | 135 | 20 |
| FedInceptionResNetV2 | 3e−4 | 3e−3 | 100% | 50% | 19 | 20 |
| FedInceptionResNetV2 | 3e−4 | 3e−4 | 100% | 50% | 133 | 20 |

FIG. 6

Federated Computer Vision for Anomaly Detection

Input: a set of video data
Output: a vector with classification result

```
Trim the anomaly events from the video
Perform histogram-based noise cleaning to remove noisy frames
Randomly select N number of frames from each video data
Divide the dataset among k different clients where each client will have a subset of the entire dataset
for round t = 1,2,...
    Apply a pretrained CNN model to extract feature maps from the dataset
    Employ a RNN model to understand temporal dependencies
    Use fully connected layers and classify videos
    Share the local model parameters for global aggregation
    Perform aggregated model's evaluation on the validation dataset
```

FIG. 7

SYSTEMS AND METHODS FOR DETECTING ANOMALIES IN VIDEOS

GOVERNMENT SUPPORT

This invention was made with government support under 17STCIN00001 awarded by the Department of Homeland Security, Science and Technology. The government has certain rights in the invention.

BACKGROUND

Recently, the deployment of surveillance cameras across various locations for monitoring purposes has surged, with the total number of cameras globally exceeding one billion. Traditionally, human operators monitor these camera feeds to detect suspicious or anomalous activities. However, the inefficiency of human monitoring is evident due to the significant time and labor required.

BRIEF SUMMARY

Embodiments of the subject invention provide novel and advantageous systems and methods for detecting anomalies in videos (e.g., surveillance videos) in a distributed manner to enhance data privacy and improve model robustness, model accuracy, and scalability of the system. Computer-based systems and methods in these settings can ensure enhanced privacy among different computing devices/clients while training a machine learning (ML) model without the requirement of data sharing with a server. A data trimming method, a histogram-based noise cleansing method, a frame selection method, a data distribution method among different clients, and/or a convolutional neural network (CNN) and recurrent neural network (RNN) (CNN-RNN) model can be employed for video classification. The CNN can be used to extract features from data, and the RNN can be used to understand the underlying sequential relationship. In addition, systems and methods can leverage federated learning (FL).

In an embodiment, a system for anomaly detection in a video can comprise a processor and a machine-readable medium in operable communication with the processor and having instructions stored thereon that, when executed by the processor, perform the following steps: receiving video data of the video; selecting an appropriate (e.g., predetermined) threshold (e.g. a sampling rate or a quantity of sampled frames compared to the total frames of the video) for reducing the number of frames of the video (e.g., while keeping the data consistent and minimizing information loss) (e.g., the selected threshold can be, for example, to sample the frames of the video every predetermined number of frames (e.g., every five frames)); distributing the video data to a plurality of edge device clients, such that each edge device clients receives a different portion of the video data with a number of frames based on the selected threshold; training, by the plurality of edge device clients, of a model that comprises a CNN and an RNN, such that the training includes limited communication between a central server and the plurality of edge device clients (e.g., only model weight updates are communicated to the central server per iteration, and it may be the case that there is no other communication between the central server and the plurality of edge device clients during the training); and after the training of the model, running the model on the video data to identify any anomalies in the video (this can be performed after the training of the model by the plurality of edge device clients). The instructions when executed can further perform the following step(s): before distributing the video data to the plurality of edge device clients, trimming the video data; and/or before distributing the video data to the plurality of edge device clients, noise cleansing the video data using histogram analysis (these two steps can be performed before selecting the threshold). The trimming of the video data can be performed before the noise cleansing. The RNN architecture can comprise a gated recurrent unit (GRU) model; for example, the RNN can comprise GRUs and at least one dense layer (e.g., a plurality of dense layers) after the GRUs. The CNN can comprise a plurality of sections, and each section of the plurality of sections can comprise settings of convolutional layers (e.g., convolutional two-dimensional (2D) layers), a batch normalization layer, and/or a max pooling layer (e.g., a max pooling 2D layer). The CNN can further comprise a global max pooling layer (e.g., a global max pooling 2D layer), which can be after the plurality of sections. The step of running the model on the video data to identify any anomalies in the video can comprise running the video data through the CNN and then subsequently through the RNN. The video from which the input video data is received can be, for example, a surveillance video. The anomalies in the video can comprise, for example, crimes being committed and/or incidents related to (and/or indicative of) crimes being committed. The system can further comprise: at least one camera (e.g., surveillance camera) in operable communication with the processor and/or the machine-readable medium and configured to capture the video; and/or at least one display in operable communication with the processor and/or the machine-readable medium and configured to display results of any of the steps, including the running of the model on the video data to identify any anomalies in the video. The video data can be stored on the machine-readable medium. The processor and/or the machine-readable medium can be part of a central server.

In another embodiment, a method for anomaly detection in a video can comprise: receiving (e.g., by a processor) video data of the video; selecting (e.g., by the processor) an appropriate (e.g., predetermined) threshold (e.g. a sampling rate or a quantity of sampled frames compared to the total frames of the video) for reducing the number of frames of the video (e.g., while keeping the data consistent and minimizing information loss) (e.g., the selected threshold can be, for example, to sample the frames of the video every predetermined number of frames (e.g., every five frames)); distributing (e.g., by the processor) the video data to a plurality of edge device clients, such that each edge device clients receives a different portion of the video data with a number of frames based on the selected threshold; training, by the plurality of edge device clients, of a model that comprises a CNN and an RNN, such that the training includes limited communication between a central server and the plurality of edge device clients (e.g., only model weight updates are communicated to the central server per iteration, and it may be the case that there is no other communication between the central server and the plurality of edge device clients during the training); and after the training of the model, running (e.g., by the processor) the model on the video data to identify any anomalies in the video (this can be performed after the training of the model by the plurality of edge device clients). The method can further comprise: before distributing the video data to the plurality of edge device clients, trimming (e.g., by the processor) the video data; and/or before distributing the video data to the plurality of edge device clients, noise cleansing (e.g., by the processor) the video data using histogram analysis (these two steps can be performed before selecting the number of frames of the video). The trimming of the video data can be performed before the noise cleansing. The RNN architecture can comprise a GRU model; for example, the RNN can comprise at GRUs and at least one dense layer (e.g., a plurality of dense layers) after the GRUs. The CNN can comprise a plurality of sections, and each section of the plurality of sections can comprise settings of convolutional layers (e.g., convolutional 2D layers), a batch normalization layer, and/or a max pooling layer (e.g., a max pooling 2D layer). The CNN can further comprise a global max pooling layer (e.g., a global max pooling 2D layer), which can be after the plurality of sections. The step of running the model on the video data to identify any anomalies in the video can comprise running the video data through the CNN and then subsequently through the RNN. The video from which the input video data is received can be, for example, a surveillance video. The anomalies in the video can comprise, for example, crimes being committed and/or incidents related to (and/or indicative of) crimes being committed. The video data can be received from at least one camera (e.g., surveillance camera) (in operable communication with the processor) configured to capture the video; and/or displaying (e.g., by the processor) on at least one display (in operable communication with the processor) results of any of the steps, including the running of the model on the video data to identify any anomalies in the video. The video data can be stored on a machine-readable medium in operable communication with the processor, the at least one camera, and/or the at least one display. The processor and/or the machine-readable medium can be part of a central server.

BRIEF DESCRIPTION OF DRAWINGS

FIG. 6 shows a table of experimental results on a model (FedInceptionResNetV2) on different learning rates.

FIG. 7 shows an algorithm for federated computer vision for anomaly detection, according to an embodiment of the subject invention.

DETAILED DESCRIPTION

Figure 1:
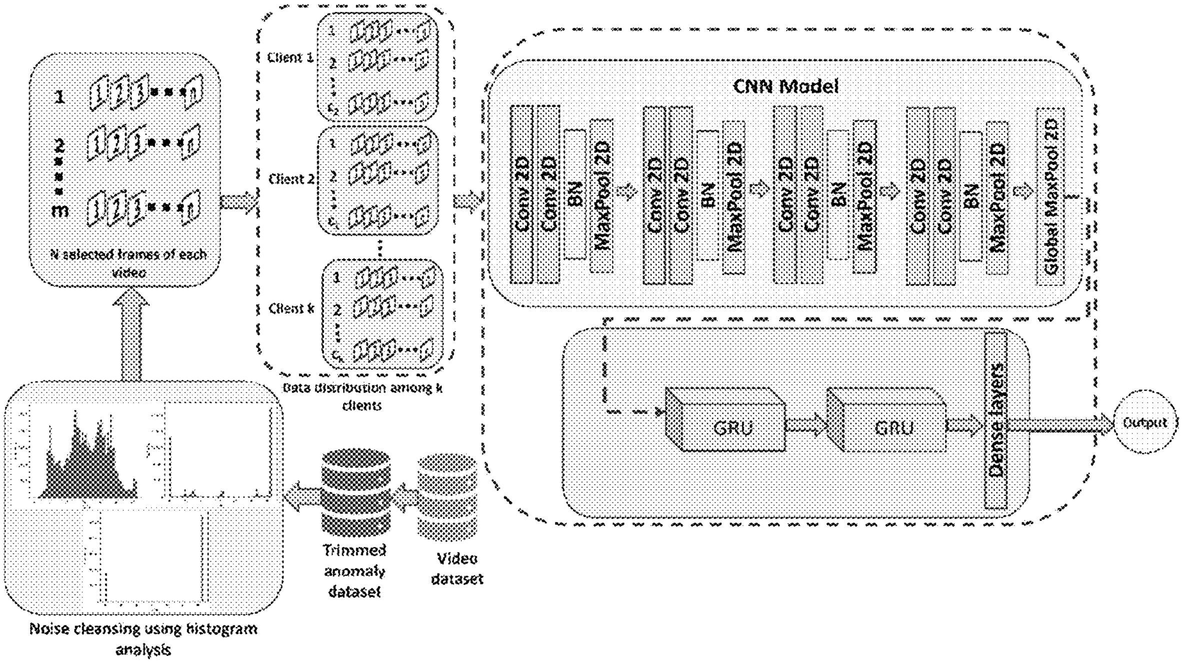
FIG. 1 shows a federated anomaly detection architecture, according to an embodiment of the subject invention.
Figure 2:
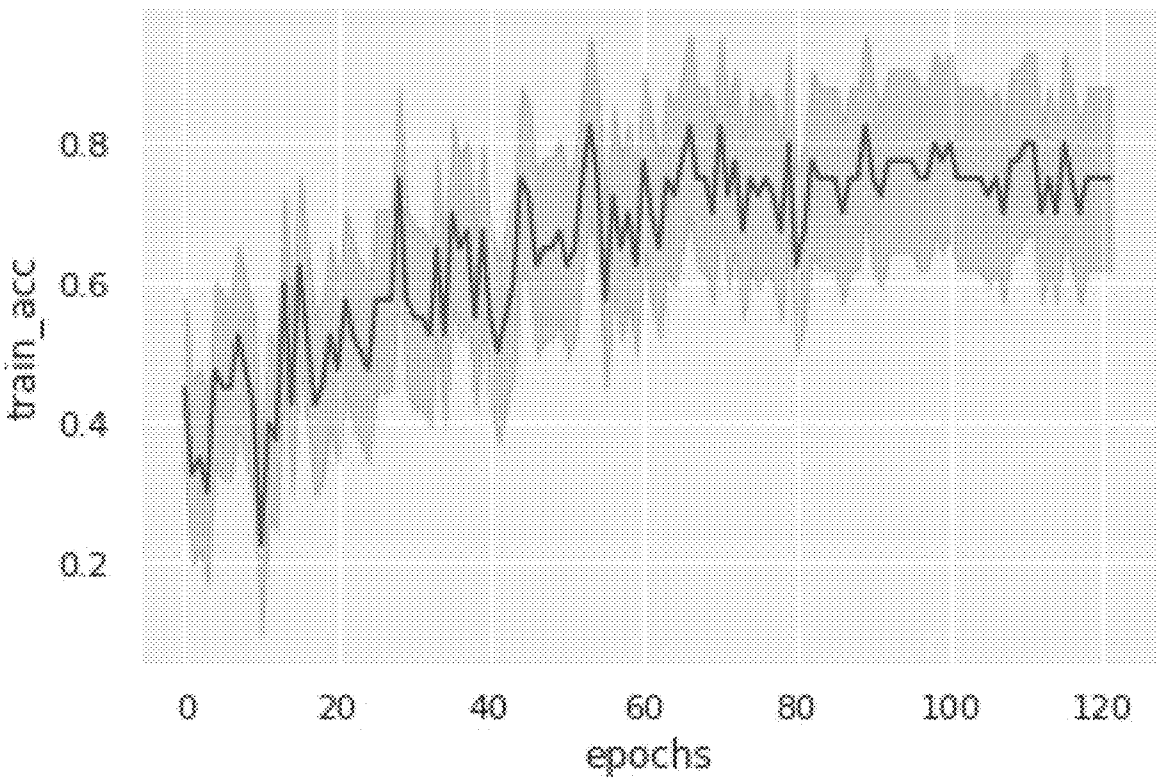
FIG. 2 shows a plot of training accuracy versus epochs, showing the training accuracy of a model (which can be referred to herein as FedInceptionResNetV2). The plot shows the accuracy is nearly 1.0 (i.e., 100%).
Figure 3:
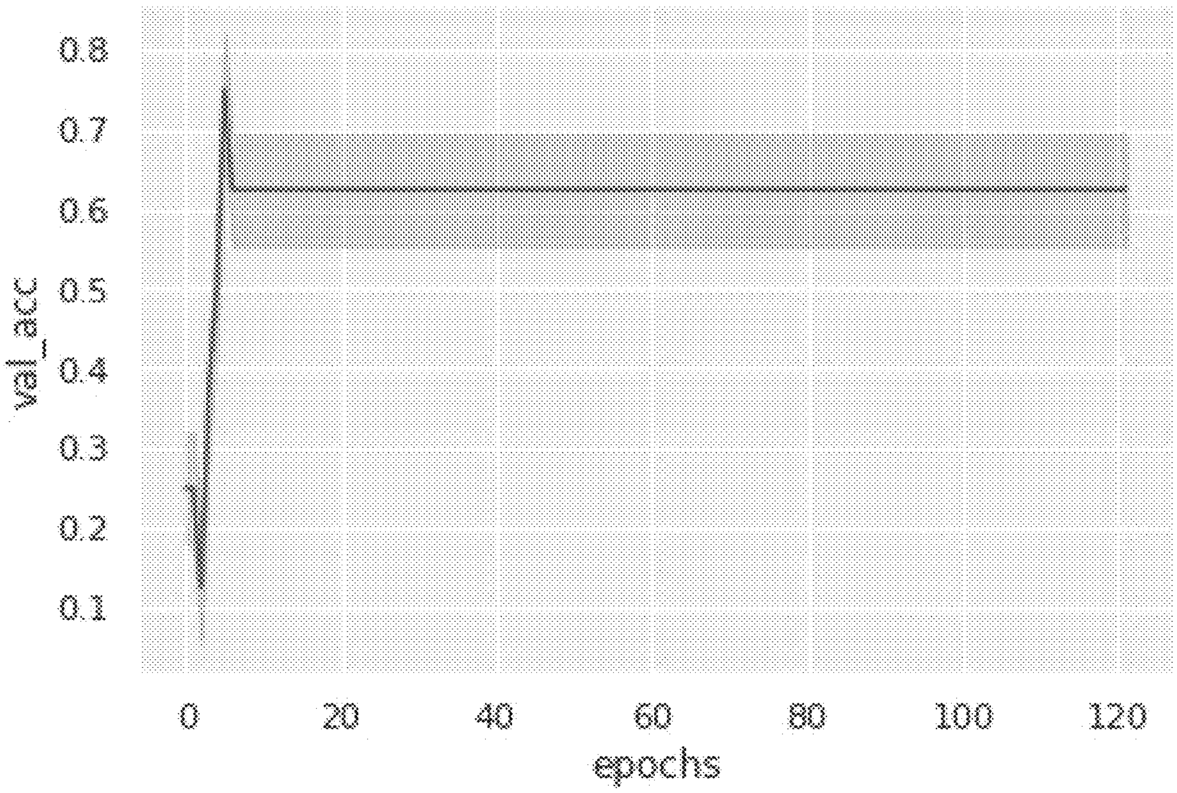
FIG. 3 shows a plot of validation accuracy versus epochs, showing the validation accuracy of a model (FedInceptionResNetV2). The plot shows that the accuracy was about 0.635 (i.e., 63.5%).
Figure 4:
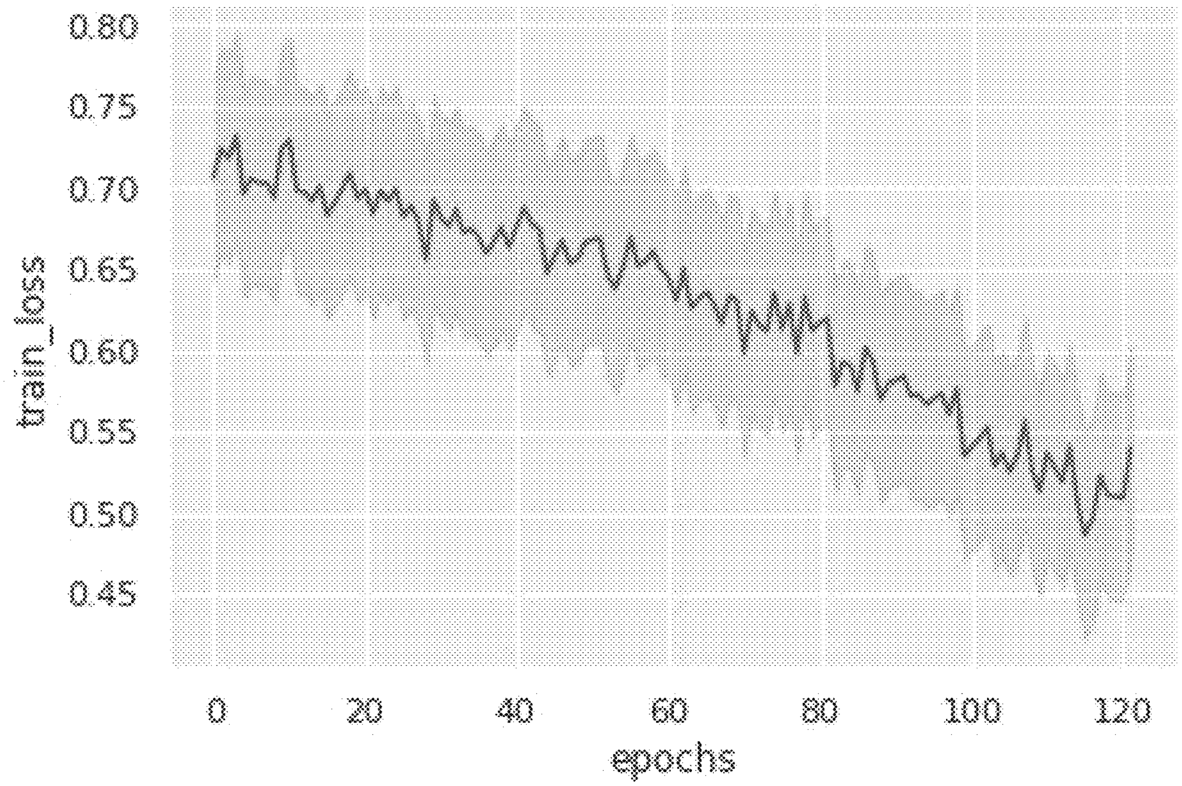
FIG. 4 shows a plot of training loss versus epochs, showing the training loss of a model (FedInceptionResNetV2).
Figure 5:
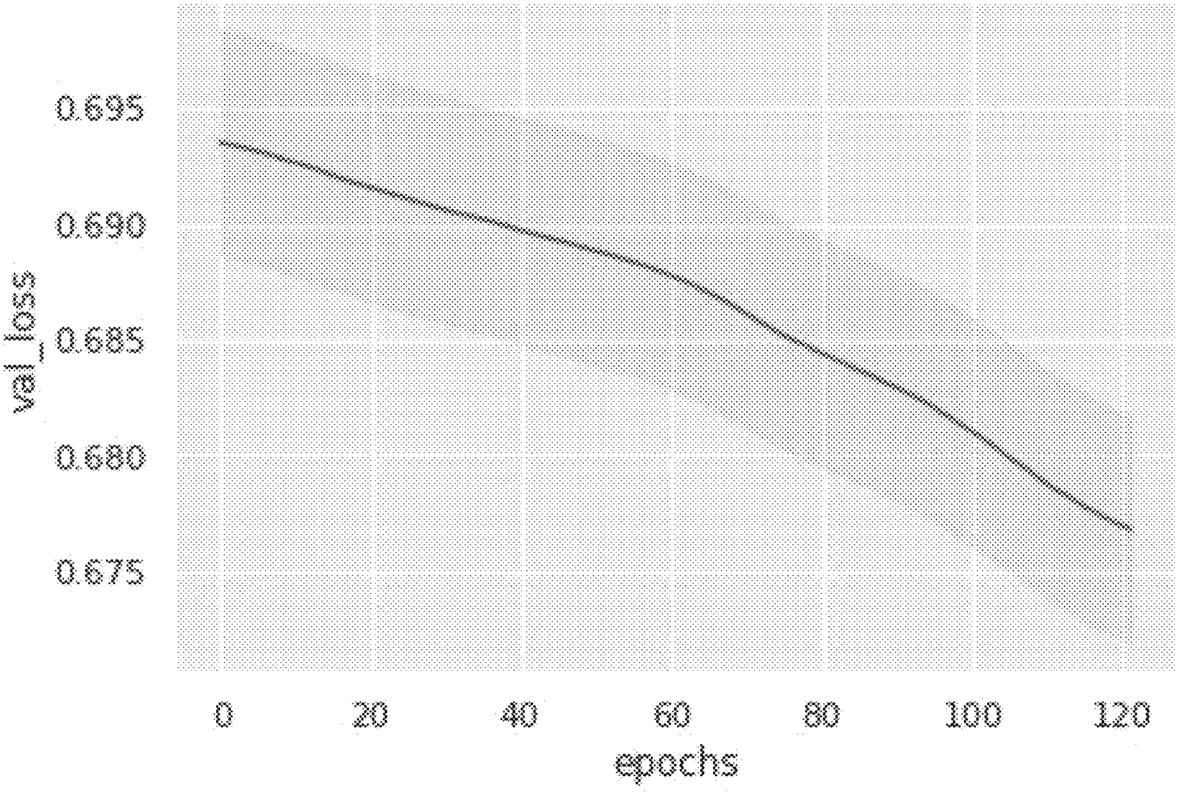
FIG. 5 shows a plot of validation loss versus epochs, showing the validation loss of a model (FedInceptionResNetV2 fine-tuned model).

Embodiments of the subject invention provide novel and advantageous systems and methods for detecting anomalies in videos (e.g., surveillance videos) in a distributed manner to enhance data privacy and improve model robustness, model accuracy, and scalability of the system. Computer-based systems and methods can ensure enhanced privacy among different computing devices/clients while training a machine learning (ML) model without the requirement of data sharing with a server. A data trimming method, a histogram-based noise cleansing method, a frame selection method, a data distribution method among different clients, and/or a convolutional neural network (CNN) and recurrent neural network (RNN) (CNN-RNN) model can be employed for video classification. The CNN can be used to extract features from data, and the RNN can be used to understand the underlying sequential relationship. In addition, systems and methods can leverage federated learning (FL) (see also; LeCun et al., Gradient-based learning applied to document recognition, Proceedings of the IEEE 86.11, 2278-2324, 1998; Rumelhart et al., Learning representations by back-propagating errors, Nature 323.6088, 533-536, 1986; and McMahan et al., Communication-efficient learning of deep networks from decentralized data. In Artificial intelligence and statistics, pp. 1273-1282, PMLR, 2017; all three of which are hereby incorporated by reference herein in their entireties).

Anomaly detection in surveillance videos is important for many reasons, including the ability to detect crimes at a higher rate. Artificial intelligence (AI)-based solutions can help improve upon the traditional approach of mirroring surveillance camera outputs on multiple screens by a human operator. However, to develop an AI-based solution, the conventional approach of gathering the data in a centralized fashion and then performing model training may lead to privacy concerns. Embodiments of the subject invention address this challenge related to privacy concerns by providing an agent-based solution, where data remains on edge devices (instead of a central server), that incorporates a CNN-RNN model and leverages FL.

As alluded to above, anomaly detection is critical in video surveillance because interpreting real-world anomalous activities is complex. Consequently, there is a pressing need for an automated system capable of identifying anomalies in videos. A goal of an effective anomaly detection system is to quickly alert operators to activities that deviate from normal patterns and specify the time frame of the anomaly. Thus, anomaly detection provides an initial level of video analysis, distinguishing irregularities from normal patterns. Detecting abnormal events in real-world surveillance is challenging due to their rarity and the unpredictable nature of such events. Various video anomaly detection (VAD) approaches can attempt to address this, but traditional VAD techniques depend heavily on manual annotation of anomalies, which is difficult due to the infrequent and brief nature of these events in real-life situations. Recent advancements have introduced VAD methods that utilize video-level labels and weakly supervised (WS) training to reduce annotation costs. Reconstruction-based methods for identifying anomalous frames have also been explored.

The use of computational algorithms, particularly CNNs, to analyze images or videos is commonly referred to as computer vision (CV). CV plays a vital role across numerous sectors, including surveillance, autonomous vehicles, and others. VAD has been used more frequently recently due to its broad applicability. Despite the diverse approaches employed over time, VAD remains challenging due to the scarcity of anomalous data and privacy concerns. Consequently, the necessity of applying FL in VAD has become increasingly apparent.

FL is a decentralized ML approach designed for training models on distributed data. Unlike traditional methods that centralize data on a powerful server, FL leverages the increasing computational power at the edge. The conventional approach results in data transfer across devices, causing runtime and latency issues, especially with sensitive personal information. To address challenges related to security, latency, and specific use cases, FL can be explored for real-time ML problems. Models can be trained locally, with only model weight updates communicated to the central server per iteration. These weights are then combined using various algorithms (e.g., federated averaging) to create a global model, which is then redistributed among participating clients. This privacy-preserving feature makes FL suitable for solving problems such as video anomaly detection, where sensitive data is involved.

The application of FL to video anomaly detection is not present in the related art. Implementing anomaly detection in surveillance videos through an FL approach offers the potential to overcome existing limitations, enhancing privacy preservation and enabling more effective model adaptation across diverse data sources. Embodiments of the subject invention provide FL versions of CNN models that utilize their pre-trained capabilities to accurately detect frames and determine the timing of anomalous events in surveillance videos.

Embodiments of the subject invention provide unsupervised anomaly detection systems and methods for videos, including a distributed learning structure to classify anomaly videos and enhance privacy by keeping data within local edge clients (see also, e.g., U.S. Pat. No. 11,875,566, which is hereby incorporated by reference herein in its entirety). Embodiments also provide the use of pre-trained models to extract features from video frames and provide an end-to-end neural network-based video anomaly detection method in a federated environment. An RNN (e.g., gated recurrent unit (GRU)) can be incorporated to account for temporal information in anomaly detection.

With respect to data distribution among clients in embodiments of the subject invention, the length of the video data can vary significantly, with some videos being longer than others. To create a consistent dataset, an appropriate number of video frames (n) can be selected from each video in a sequential manner, ensuring that the temporal information of the video data is maintained (this can be referred a selected threshold). For the FL dataset, the video data can be divided among different clients. For instance, if the dataset D contains m data points, it can be divided among k clients, with each client receiving a subset of D. Let $C_i$ represent the subset of data points assigned to client i, where i ranges from 1 to k. Therefore, $D=C_1 \uparrow C_2 \cup \ldots \cup C_k$. Additionally, each subset $C_i$ is a subset of D, meaning every data point in $C_i$ is also present in D and $C_i \leq D$.

With respect to the classification model in embodiments of the subject invention, video classification is an ordinal or temporal problem, similar to text and speech processing, where the output depends on previous elements in the sequence. Thus, a CNN-RNN architecture can be utilized to classify videos in a federated setting. A CNN model can be employed to extract features from the selected video frames, specifically using the pretrained InceptionResNetV2 model, which is trained on the ImageNet large-scale dataset. To understand the sequential relationships, an RNN (e.g., GRU) can be applied. After extracting features with the CNN model, these features can be passed into the RNN (e.g., GRU) layers, followed by dense layers for classification. The learning rates for the client and server can be set to, for example, 3e-6 and 5e-4, respectively (where "e-x" represents "$\times 10^{-x}$", such that 3e-6 is $3\times 10^{-6}$). The input shape for the CNN model can be, for example, (20, 112, 112, 3), and the Adam optimizer can be used for both client and server. For the dense layers, L1 and L2 kernel regularizers can be applied. To reduce overfitting, dropout rates (e.g., of 0.5, 0.5, and 0.7) can be used for the last three dense layers.

FIG. 1 shows a federated anomaly detection architecture, according to an embodiment of the subject invention, and FIG. 7 shows an algorithm for federated computer vision for anomaly detection, according to an embodiment of the subject invention. In FIG. 1, the "GRU" is the RNN. Referring to FIG. 1, noise cleaning (e.g., using histogram analysis) and/or trimming can be performed as part of a preprocessing step. Then, frames of each video can be selected and distributed to all clients to train the model in a distributed manner (i.e., FL). Next, the CNN and RNN can be used after the training to give an output, which can include whether any anomalies exist in the video (e.g., a crime being committed) and the time within the video of any such anomalies.

Embodiments of the subject invention provide enhanced privacy and scalability by leveraging distributed learning among edge computing devices and avoiding a need to share data with a central server (compared to, e.g., U.S. Pat. No. 11,875,566). FL can be used for video anomaly detection, and a CNN-RNN structure can be used to consider spatio-temporal relationship(s) of a video for classification in the distributed environment. Fine-tuning can be done by performing various experiment settings. Data preprocessing, frame selection, and/or data distribution methods can also be employed in the setup to ensure better performance.

Embodiments of the subject invention provide a distributed ML environment for video anomaly detection. A pre-trained CNN model with an integrated RNN structure can be for anomaly detection, and embodiments can classify both normal and anomalous videos (e.g., surveillance videos). Embodiments can be used for many applications, including distributed video anomaly detection using outputs of image sensors (e.g., cameras, such as surveillance cameras) that can improve the video anomaly detection performance and/or facilitate monitoring of multiple image sensor (e.g., camera, such as surveillance camera) outputs more effectively.

Embodiments of the subject invention provide a framework to detect anomalous events utilizing a model (e.g., a pretrained model, such as one based on the ImageNet large-scale dataset). Features can be extracted from video data (e.g., from publicly available video data) using the pretrained model. Then, this data can be processed for instance segmentation (e.g., 30 frames per instance). The instance segmentation can also be summarized to calculate instance difference. The instance difference can be further processed for normalization. Based on the instance difference, anomalies can be detected where there is a significant difference in between the instances. The results produced by these tools can be visualized (e.g., on a display).

Embodiments of the subject invention can classify anomaly videos using an FL framework that employs a pretrained CNN model to extract feature maps from the input video. To understand the internal temporal dependencies within a video, an RNN model/structure can be applied. The input data can also be preprocessed by using trimming and/or noise cleansing methods. Moreover, to make the training dataset consistent and remove biasness, a fixed number of frames can be selected from each (group of) video data. Then, the data can be distributed among different clients to train the model in a distributed manner where the clients train the shared model locally utilizing their local computational resources with their local dataset (i.e., without needing to communicate with the server during the training).

While anomalous events are hard to detect, even by human agents, embodiments of the subject invention can localize anomalous events accurately in most scenarios with sufficient data availability and acceptable video quality. However, due to noise in the dataset, some false alarms may occur from time to time.

Embodiments of the subject invention provide a focused technical solution to the focused technical problem of how to identify anomalies in video data (e.g., surveillance video data) without compromising privacy. The solution is provided by using FL such that a model can be trained without the need to share information with a central server, followed by use of a CNN and an RNN to identify anomalies in the video data. This plainly has the practical application of significantly improving the identification of anomalies (e.g., crimes being committed) in video data (e.g., surveillance video data) while enhancing security and privacy of the data. The model of embodiments of the subject invention can be integrated with a surveillance system, which comprises at least one surveillance camera and a machine-readable medium recording video data of the surveillance system. The model can be run using a processor in operable communication with the machine-readable medium and, in this way, improves the surveillance system by detecting anomalies (e.g., crimes being committed on video) without the need for a human to review the video data.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

A pretrained model according to embodiments of the subject invention discussed herein was employed in experiments, and it was fine-tuned using various hyper-parameters. Based on the empirical analysis, it was observed that the model began to overfit after 55 epochs. At this point, the training accuracy approached 100%, while the validation accuracy stood at 63.5%.

The experiment used the UCF-Crime dataset, a widely recognized benchmark in anomaly detection research. The dataset included two classes, normal videos and anomalous videos, which included footage of road accidents and explosions. The dataset included a total of 204 anomaly videos and an equivalent number of 204 normal videos. To ensure the robustness of the classification framework, the dataset was meticulously balanced, a crucial step aimed at mitigating biases and facilitating more accurate model performance across both classes.

A pretrained InceptionResNetV2 model (according to an embodiment of the subject invention) was employed in the experiments, and it was fine-tuned with various hyper-parameters. The CNN, RNN, and FL used were those from LeCun et al. (supra.), Rumelhart et al. (supra.), and McMahan et al. (supra.), respectively. The table in FIG. 6 presents the evaluation metrics for the model under different hyper-parameter settings, including client learning rate, server learning rate, number of frames, and dropout rates. The FedInceptionResNetV2 model (according to an embodiment of the subject invention) was implemented and trained for 65 epochs, achieving an accuracy of 63.5% on the validation set and 100% on the training set. However, an increase in validation loss after 55 epochs was noted, indicating potential overfitting. To address this, early stopping during training was used. Despite this overfitting, the model demonstrated satisfactory performance in video classification.

FIGS. 2-5 illustrate the performance of the fine-tuned InceptionResNetV2 model, showing training and validation accuracy along with their respective losses. Various client and server learning rates were used for experiments: (1e-5, 3e-4); (3e-6, 5e-4); (3e-6, 5e-4); (1e-4, 1e-4); (3e-5, 5e-4); (3e-5, 6e-4); (3e-4, 3e-3); and (3e-4, 3e-4) for model fine-tuning (where each pair in parentheses represents (client learning rate, client learning rate). It can be seen that the client learning rate of 3e-6 (i.e., $3\times10^{-6}$) and the server learning rate of 5e-4 (i.e., $5\times10^{-4}$) yielded the best results.

Embodiments of the subject invention provide distributed agent-based architectures configured (and/or designed) to detect anomalous activities in videos (e.g., surveillance videos), utilizing a combination of CNNs for feature extraction and RNNs for frame-level video classification. By leveraging CNNs to extract spatial features and RNNs to capture temporal dependencies, embodiments can identify anomalous videos in an effective manner. A key element of the approach is the integration of FL, enabling collaborative model training across distributed devices while maintaining privacy and security.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for anomaly detection in a video, the system comprising:

a processor; and a machine-readable medium in operable communication with the processor and having instructions stored thereon that, when executed by the processor, perform the following steps:

receiving video data of the video;

selecting a threshold with respect to a number of frames of the video;

distributing the video data to a plurality of edge device clients, such that each edge device clients receives a different portion of the video data based on the selected threshold;

training, by the plurality of edge device clients, of a model that comprises a convolutional neural network (CNN) and a recurrent neural network (RNN), such that the training includes limited communication between a central server and the plurality of edge device clients; and after the training of the model, running the model on the video data to identify any anomalies in the video.

2. The system according to claim 1, the instructions when executed further performing the following step:

before distributing the video data to the plurality of edge device clients, trimming the video data.

3. The system according to claim 1, the instructions when executed further performing the following step:

before distributing the video data to the plurality of edge device clients, noise cleansing the video data using histogram analysis.

4. The system according to claim 1, the RNN comprising a gated recurrent unit (GRU) model.

5. The system according to claim 4, the RNN comprising two GRUs and at least one dense layer after the two GRUs.

6. The system according to claim 1, the CNN comprising a plurality of sections, each section of the plurality of sections comprising at least one convolutional layer, a batch normalization layer, and a max pooling layer.

7. The system according to claim 6, the CNN further comprising a global max pooling layer.

8. The system according to claim 1, the step of running the model on the video data to identify any anomalies in the video comprising running the video data through the CNN and then subsequently through the RNN.

9. The system according to claim 1, the video being a surveillance video.

10. The system according to claim 9, the anomalies in the video comprising incidents related to crimes being committed.

11. The system according to claim 1, further comprising a camera in operable communication with the processor and configured to capture the video.

12. A method for anomaly detection in a video, the method comprising:

receiving video data of the video;

selecting a threshold with respect to a number of frames of the video;

distributing the video data to a plurality of edge device clients, such that each edge device clients receives a different portion of the video data based on the selected threshold;

training, by the plurality of edge device clients, of a model that comprises a convolutional neural network (CNN) and a recurrent neural network (RNN), such that the training includes limited communication between a central server and the plurality of edge device clients; and after the training of the model, running the model on the video data to identify any anomalies in the video.

13. The method according to claim 12, further comprising:

before distributing the video data to the plurality of edge device clients, trimming the video data and noise cleansing the video data using histogram analysis.

14. The method according to claim 12, the RNN comprising a gated recurrent unit (GRU) model.

15. The method according to claim 14, the RNN comprising two GRUs and at least one dense layer after the two GRUs.

16. The method according to claim 12, the CNN comprising a plurality of sections and a global max pooling layer, each section of the plurality of sections comprising at least one convolutional layer, a batch normalization layer, and a max pooling layer.

17. The method according to claim 12, the step of running the model on the video data to identify any anomalies in the video comprising running the video data through the CNN and then subsequently through the RNN.

18. The method according to claim 12, the video being a surveillance video, and the anomalies in the video comprising incidents related to crimes being committed.

19. A system for anomaly detection in a video, the system comprising:

a processor; and a machine-readable medium in operable communication with the processor and having instructions stored thereon that, when executed by the processor, perform the following steps:

receiving video data of the video;

trimming the video data;

noise cleansing the video data using histogram analysis;

selecting a threshold with respect to a number of frames of the video;

distributing the video data to a plurality of edge device clients, such that each edge device clients receives a different portion of the video data based on the selected threshold;

training, by the plurality of edge device clients, of a model that comprises a convolutional neural network (CNN) and a recurrent neural network (RNN), such that the training includes limited communication between a central server and the plurality of edge device clients; and after the training of the model, running the model on the video data to identify any anomalies in the video, the RNN comprising two gated recurrent units (GRUs) and at least one dense layer after the two GRUs, the CNN comprising a plurality of sections and a global max pooling layer, each section of the plurality of sections comprising at least one convolutional layer, a batch normalization layer, and a max pooling layer, the step of running the model on the video data to identify any anomalies in the video comprising running the video data through the CNN and then subsequently through the RNN, the video being a surveillance video, and the anomalies in the video comprising incidents related to crimes being committed.

20. The system according to claim 19, further comprising a camera in operable communication with the processor and configured to capture the video.

* * * * *